Dec. 6, 1949     H. W. COLE ET AL     2,490,620

LEAK-PROOF COUPLING

Filed March 7, 1947

INVENTORS
HARRY W. COLE
MERRILL F. SPROUL
BY E. W. Marshall
ATTORNEY

Patented Dec. 6, 1949

2,490,620

UNITED STATES PATENT OFFICE 2,490,620

LEAKPROOF COUPLING

Harry W. Cole, New Rochelle, N. Y., and Merrill F. Sproul, Tenafly, N. J., assignors to Packless Metal Products Corporation, New Rochelle, N. Y., a corporation of New York Application March 7, 1947, Serial No. 733,082

5 Claims. (Cl. 285—122)

1

This invention relates to a leak-proof coupling for tubing, and its object is to provide a simple device for flaring the end of a tube of deformable material by the coaction of a pair of coupling members, and at the same time attaching the flared end of the tubing between the coupling members to form a leak-tight connection therewith without the use of solder or packing.

Another object is to provide such an arrangement which can be applied readily without the use of special tools. More particularly, the object of our invention is to provide a novel structure for applying the coupling members to the tubing without subjecting the tubing to torsional strains.

In Patent 2,112,239, issued March 29, 1938, to Stephen Guarnaschelli, a coupling of the type to which our invention relates, which went into successful use, is shown. It was found, however, that in applying the device shown therein the tubing was subjected to undesirable torsional strains. The patentee found one way of overcoming this defect, which is shown in Patent 2,128,459, issued August 30, 1938. We have found that the problem can be solved in a simple way and with an inexpensive structure. This we will describe in the following specification.

Referring to the drawings,

Figs. 5A–8A are end elevations of the collars shown in Figs. 5–8.

Figure 1:
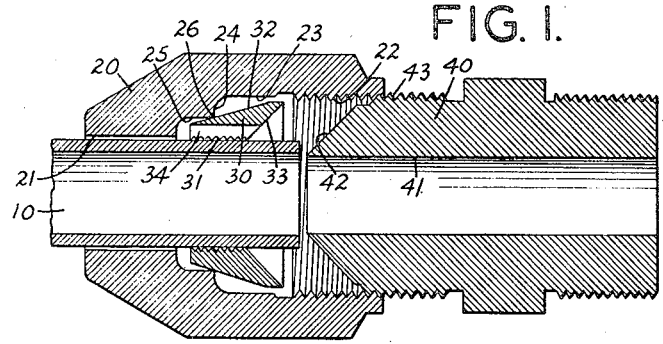
Fig. 1 is a sectional elevation of a part of a tubing and the parts of a coupling device which are made according to and embody our invention. In this figure the parts are assembled about an unflared end of the tubing.

10 designates a tubing of deformable metal or other material. 20 is one of a pair of coupling members, in one end portion of which is a bore 21 of such a diameter that it may be slipped over the tubing. The other end portion of this member is of larger diameter and is internally threaded, as shown at 22. Between these end portions is a bore 23 of approximately the diameter as that of the threaded portion 22, which terminates in a transverse shoulder 24. 25 is a smaller bore, which forms, with the shoulder 24, an annular edge 26.

30 is a collar. This has a cylindrical bore 31 of substantially the same size as the outside of the tubing 10. The surface of this bore may be

Figure 3:
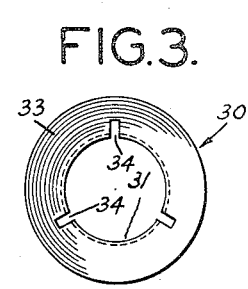
Fig. 3 is an end elevation of a collar which is shown in the preceding figures.

2 roughened, as shown. The maximum outer diameter of the collar is slightly less than the diameters of the threads 22 and the bore 23, so that it may be slipped into the coupling member 20 and onto the tubing 10, as shown in Fig. 1. The outer surface 32 of the collar is tapered conically. The movement of the collar into the coupling member is limited by the engagement of the surface 32 with the edge 26 formed in the coupling member. The larger end of the collar is constructed to form a concave conical surface 33 at an angle to cooperate in forming a flare 11 on the end of the tubing 10. The conical surface 32 preferably is flatter than the surface 33. One or more longitudinal grooves 34 are made in the bore of the collar to increase its compressibility. As shown in Fig. 3, there are three of these grooves, which do not extend through the part of the conical surface 32, which is engaged by the edge 26.

40 designates another coupling member. This has a cylindrical bore 41, the diameter of which is slightly less that the inside diameter of the tubing 10. It has a convex conical end 42 of the same angularity as that of the surface 33, and a cylindrical body which is externally threaded as at 43 to engage the threads 22 in the first described coupling member. At least a part of each of the coupling members may be so formed that it may be engaged by a wrench.

Figure 2:
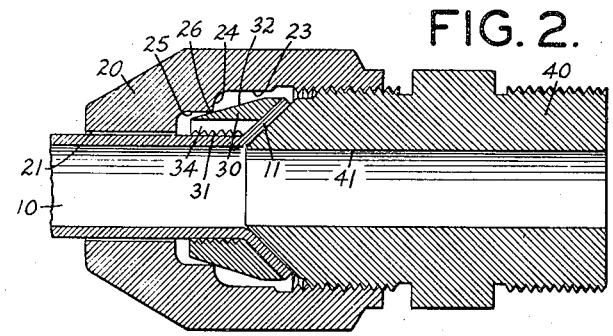
Fig. 2 is a similar view of the same parts, with the end of the tubing flared and tightly engaged between the coupling members to form a leakproof joint connection.

In operation, the coupling member 20 is placed on the tubing 10 and the collar 30 is forced onto the tubing a desired distance from its end. After the parts have been thus assembled in the manner shown in Fig. 1, relative rotation between the coupling members will force the end 42 of the member 40 into the end of the tubing 10 and cause it to be flared outwardly against the surface 33 until the parts reach the relative positions in which they are shown in Fig. 2. This may be accomplished without subjecting the tubing to any undue torsional strains, because of the fact that there is a substantially line contact between the edge 26 of the coupling member 20 and the conical surface 32 of the collar and. therefore, very little friction between them. It is not necessary to have the edge 26 a sharp one, as it may be rounded, or even flattened to some extent, without destroying its desirable function. The pressures thus applied to the collar will compress the thinner part of it inwardly onto the tubing and maintain it against longitudinal movement thereon. The grooves 34 make this part of the collar somewhat flexible, and the roughened surface of its bore causes it to grip the tubing tightly.

Figure 4:
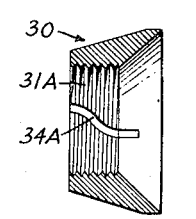
Fig. 4 is a sectional side elevation of a collar of modified construction.

The grooves 34 are not necessarily parallel with the axis of the collar. In Fig. 4 a groove 34A is shown, which is spirally disposed in relation to the axis. This has a further tendency to prevent longitudinal movement of the collar on the tubing. In this figure the roughened surface of the bore of the tubing is shown at 31A as right-hand screw-threads.

As the purpose of the groove or grooves in the collar is to increase their flexibility, it is evident that there may be but one of them or several and that they may be cut into the bore or into the outer surface of the collar, or into the bore and into the outer surface of the collar. If there is but one groove, it may extend from the bore to the outer surface. Some of many of such modifications are illustrated in Figs. 5-8 and Figs. 5A-8A. In all of these figures the bore 31 is shown smooth; it is not necessary to have it roughened.

Figure 5:
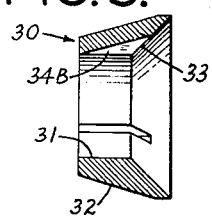
Figs. 5–8 are sectional side elevations of collars of modified constructions.
Figure 5A:
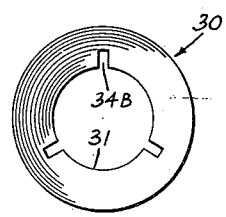
Figure 7:
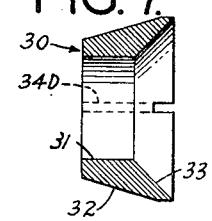
Figure 7A:
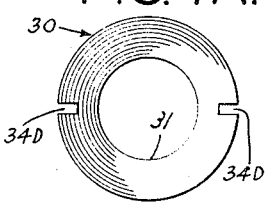

In Figs. 5 and 5A the bases of the grooves 34B are parallel with the conical surface 32.

Figure 6:
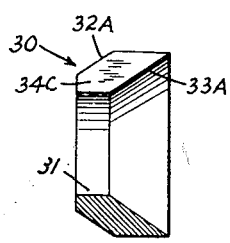
Figure 6A:
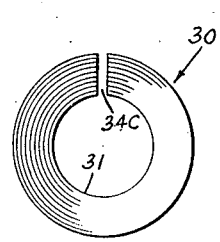
Figure 8:
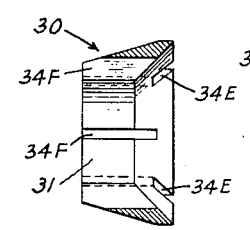
Figure 8A:
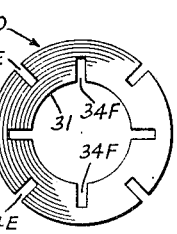

In Figs. 6 and 6A the conical surfaces 32A, 33A are parallel, and there is but one groove, 34C, and that extends through the collar from the bore 31 to its outer surface.

Two diametrically opposed grooves 34D in the outer surface of the collar are shown in Figs. 7, 7A, and Figs. 8, 8A four angularly spaced grooves 34E are provided in the outer surface of the collar, and four intermediate grooves, 34F, are provided in the bore.

The leak-proof connection is thus formed between the end of the tubing and the coupling members without the use of solder or packing, and a mechanical attachment is effected which is capable of resisting technical strains.

Various modifications in construction, mode of operation, method and use of an invention may and do occur to others, especially after benefiting from knowledge of such a disclosure as that herein presented of the principles involved, but the invention itself is not confined to the present showing.

We claim:

1. The combination of a pair of coupling members arranged for threaded engagement with each other, a tapered compressible collar arranged to be interposed between the first of said members and a tubing of deformable material, said collar having a conical outer surface, a cylindrical bore and a surface flaring outwardly from one end of its bore, said first coupling member having an edge adapted to make an annular contact with the conical outer surface of the collar, and said second coupling member having a cylindrical bore slightly less in diameter than the inner diameter of the tubing, and a projection flaring outwardly from one end of its bore at an angle corresponding to that of the flaring surface of the collar.

2. The combination of a pair of coupling members arranged for threaded engagement with each other, a tapered compressible collar arranged to be interposed between the first of said members and a tubing of deformable material, said collar having a conical outer surface, a cylindrical bore, a groove in the surface of said bore and an inner surface flaring outwardly from one end of its bore, said first coupling member having an edge adapted to make an annular contact with the conical outer surface of the collar, and said second coupling member having a cylindrical bore slightly less in diameter than the inner diameter of the tubing, and a projection flaring outwardly from one end of its bore at an angle corresponding to that of the flaring inner surface of the collar.

3. The combination of a pair of coupling members arranged for threaded engagement with each other, a tapered compressible collar arranged to be interposed between the first of said members and a tubing of deformable material, said collar having an outer convex conical surface flaring outwardly from one of its ends, a cylindrical bore, a groove in the surface of said bore, and an inner concave surface flaring outwardly from its other end, said first coupling member having an edge adapted to make an annular contact with the conical outer surface of the collar, and said second coupling member having a cylindrical bore slightly less in diameter than the inner diameter of the tubing, and a projection flaring outwardly from one end of its bore at an angle corresponding to that of the flaring surface of the collar.

4. The combination of a pair of coupling members arranged for threaded engagement with each other, a tapered compressible collar arranged to be interposed between the first of said members and a tubing of deformable material, said collar having a convex conical outer surface flaring outwardly from one of its ends, a cylindrical bore, a groove in the surface of said bore, and a concave inner conical surface flaring inwardly from its other end at a steeper angle than that of the outer surface of the collar, said first coupling member having an edge adapted to make an annular contact with the conical outer surface of the collar, and said second coupling member having a cylindrical bore slightly less in diameter than the inner diameter of the tubing, and a projection flaring outwardly from one end of its bore at an angle corresponding to that of the flaring inner surface of the collar.

5. The combination of a pair of coupling members arranged for threaded engagement with each other, a tapered compressible collar arranged to be interposed between the first of said members and a tubing of deformable material, said collar having a convex conical outer surface flaring outwardly from one of its ends, a cylindrical bore with a roughened surface, a concave inner substantially longitudinal groove in the surface of said bore, and a conical surface flaring outwardly from one end of its bore at a steeper angle than that of the outer surface of the collar, said first coupling member having an edge adapted to maintain an annular contact with the conical outer surface of the collar, and said second coupling member having a cylindrical bore slightly less in diameter than the inner diameter of the tubing, and a projection flaring outwardly from one end of its bore at an angle corresponding to that of the flaring inner surface of the collar.

HARRY W. COLE.
MERRILL F. SPROUL.

REFERENCES CITED

The following references are of record in the file of this patent:

UNITED STATES PATENTS

| Number | Name | Date |
| --- | --- | --- |
| 939,501 | Hinds | Nov. 9, 1909 |
| 2,112,239 | Guarnaschelli | Mar. 29, 1938 |